3,118,921
AMINO-SILICON COMPOUNDS
Carlos M. Samour, Wellesley Hills, Mass., assignor to The Kendall Company, Boston, Mass., a corporation of Massachusetts
No Drawing. Filed Dec. 15, 1958, Ser. No. 780,250
7 Claims. (Cl. 260—448.8)

This invention relates to certain cyclic nitrogen-containing silicon compounds and pertains more specifically to condensation products of trialkanolamines with certain silicon compounds.

The compounds of the present invention contain only a single nitrogen atom for each silicon atom in the molecule, but nevertheless exhibit, in the case of compounds containing only lower aliphatic substituent groups, substantial solubility in water; in the case of compounds containing long chain aliphatic or aromatic substituent groups, they exhibit surface-active properties in water. Even more surprising, aqueous solutions of compounds of the present invention exhibit remarkable stability at moderate concentrations. However, heterolysis or deposition of silica precipitate can be induced by the addition of a soluble inorganic salt to the solution. This stability is also manifested in the fact that a period of many hours or even days is required to reach equilibrium when it is attempted to titrate the new compounds at room temperature with an acid such as perchloric acid.

The compounds are useful for a variety of purposes. Some may be employed to treat textile fibers such as cotton to deposit silica to increase slip-resistance and as bonding agents for glass cloth laminates impregnated with melamine, epoxy or phenolic resins. Some compounds are also useful as lubricants and as release agents for preventing adhesion to the surface to which they have been applied, in the latter case the compounds being applied as a film or coating from a water solution. When the products of the present invention contain a polymerizable group such as a vinyl or allyl group, they are useful as monomers, either alone or mixed with other copolymerizable monomers such as vinylaminosilane, in the manufacture of resinous polymers or copolymers suitable for use in molded resin products.

The products of the present invention are made from trialkanolamines in a variety of ways. A tetraalkyl silicate in which each alkyl group contains from 1 to 4 carbon atoms may be condensed with the trialkanolamine (triethanolamine, triisopropanolamine, diethanolmonoisopropanolamine, or diisopropanolmonoethanolamine) in equimolar proportions, or there may be condensed with the trialkanolamine, also in equimolar proportions, trialkoxysilanes having an aliphatic group with one of its carbon atoms bonded directly to the silicon atom, in which each alkoxy group contains from 1 to 4 carbon atoms and the aliphatic group, saturated or unsaturated, contains from 1 to 20 carbon atoms. In either case there are produced three molar proportions of by-product alkyl alcohol having from 1 to 4 carbon atoms. Such products have the following structure

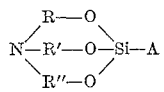

in which R, R' and R" are either —CH$_2$CH$_2$— or

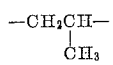

and A is either an alkoxy group having from 1 to 20 carbon atoms or an aliphatic group having from 1 to 20 carbon atoms with one of the carbon atoms bonded directly to the silicon atoms.

Glycols may also be incorporated in the products, for example by an ester interchange reaction with the tetraalkyl silicate or preferably with the initial condensation product thereof with trialkanolamine described above, the glycol serving to link together into a single molecule two or more silicon atoms by means of a bridge of oxygen and aliphatic carbon atoms.

The glycol or polyhydric alcohol which may be incorporated must have two hydroxyl groups separated by an aliphatic carbon chain at least 2, preferably from 2 to 12 carbon atoms long. A third hydroxyl group may be attached to one of the chain carbon atoms, as in the case of glycerol. In general, the glycols which may be used have the structure R'''(OH)$_n$ where $n$ is an integer from 2 to 3 and R''' is a group having an aliphatic carbon atom chain from 2 to 12 carbon atoms long connecting the hydroxy groups. The glycol may be condensed first with the tetraalkyl silicate, which has the structure (R$_1$O)$_4$Si in which R$_1$ is an alkyl group having 1 to 4 carbon atoms, followed by further condensation with a trialkanolamine having the structure

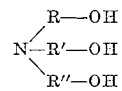

in which R, R' and R" are either —CH$_2$CH$_2$— or

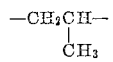

or the trialkanolamine may be first condensed with the tetraalkylsilicate after which the glycol may be condensed with the product. In either case, $n$ molar proportions of tetraalkylsilicate will react with each molar proportion of glycol and the number of molar proportions of trialkanolamine entering into the condensation reaction will also equal $n$. It will be understood that when the number of hydroxyl groups present in the glycol molecule is limited to 2, only two molar proportions of the silicate or amine reagent can react with each mole of glycol; however, when the glycol molecule contains 3 hydroxyl groups, either two or three moles of the silicate and of the amine reagent may be used and will enter into the condensation reaction. There will be liberated during the reaction $4n$ molar proportions of by-product alcohol R$_1$OH corresponding to the four R$_1$O— groups of the silicate reagent.

The glycol reagent employed in the present invention will have, as described above, an aliphatic carbon chain. Each of the carbon atoms in the chain may have one or both of its hydrogen atoms substituted by a wide variety of groups including aromatic groups and aliphatic groups containing up to as many as 10 carbon atoms or more, the properties of the resultant nitrogen-silicon compound depending in part upon the nature of the substituent groups attached to the carbon chain. Among the readily available polyhydric alcohols which may be employed are ethylene glycol; phenylethanediol-1,2; propanediol-1,2; propanediol-1,3; butanediol-1,2; butanediol-1,3; butanediol-2,3; 3-butanediol-1,2; 2-methylpropanediol-1,2; pentanediol-1,2; pentanediol-2,4; 3-methylbutanediol-1,2; 2-methylbutanediol-2,3; hexanediol-1,6; 2-methylpentanediol-1,3; 2-methylpentanediol-2,4; 2,3-dimethylbutanediol-2,3; 1,5-hexadiene-3,4-diol; hexanediol-2,3; 2,2-diethylpropanediol-1,3; octanediol-1,8; 2-propylheptanediol-1,3; 2-ethylhexanediol-1,3; 2-butylbutanediol-1,3; octanediol-4,5; 2-methyl-2-propylpropanediol-1,3; 2-butyl-2-ethylpropanediol-1,3; decanediol-1,10; 3,4-diethylhexanediol-3,4; 2,3-diphenylbutanediol-2,3; 2,4-diphenylbutanediol-1,3; 2,2-dimethylpropanediol-1,3; 2-methyl-2-nitropropanediol-1,3; 2-ethyl-2-nitropropanediol-1,3; 3-chloropropanediol-1,2; dihydroxyacetone; hexanetriol-1,2, 6; 2,5-dimethylhexyne-3-diol-2,5; glycerol; 1,2,6-hexanetriol; glycerol-1-octadecylether; glycerol monoesters such as glycerol monoacetate, glycerol monolaurate, glycerol monostearate, glycerol monopalmitate, glycerol monooleate, and glycerol monobenzoate.

Products within the scope of the present invention may also be prepared by condensing a trialkanolamine with a partially hydrolyzed tetraalkyl silicate having the structure

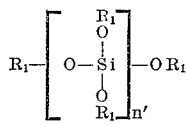

in which $R_1$ is an alkyl group having from 1 to 4 carbon atoms and $n'$ is an integer from 2 to 4. In carrying out such a condensation reaction, the number of molar proportions of trialkanolamine employed for each molar proportion of partially hydrolyzed tetraalkyl silicate is equal to the integer $n'$, and there are eliminated during the condensation reaction $2n'+2$ molar proportions of an alkanol having the structure $R_1OH$.

While the nitrogen and silicon atoms in the compounds of the present invention are not held directly together by primary valence linkages, it is believed that the unusually high water solubility of the compounds and their stability in aqueous solution is due to a secondary bond or chelate linkage directly between the nitrogen atom and the silicon atom.

Among the tetraalkyl silicates which may be employed in preparing the products of the present invention are tetramethyl silicate, tetraethyl silicate, tetra-n-propyl silicate, tetraisopropyl silicate, tetraisobutyl silicate, and tetra-n-butyl silicate. It will also be understood that products prepared from these silicates and having the structure

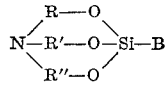

in which R, R' and R" represent either $-CH_2CH_2-$ or

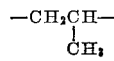

groups and in which B is an alkoxy group having from 1 to 4 carbon atoms may undergo an ester interchange reaction with one of the higher alcohols containing up to 20 carbon atoms such as amyl, hexyl, 2-ethylhexyl, decyl, lauryl, myristyl, cetyl, stearyl, or abietyl alcohol to replace the original lower alkoxy group indicated by B with one containing up to 20 carbon atoms.

The preferred aliphatic-substituted trialkoxysilanes which may be employed in preparing the compounds of the present invention include methyltriethoxysilane, ethyltriethoxysilane, beta-carboxyethyltriethoxysilane, n-propyltriethoxysilane, isopropyltriethoxysilane, gamma-aminopropyltriethoxysilane, butyltriethoxysilane, hexyltrimethoxysilane, octyltrimethoxysilane, ethyltributoxysilane, benzyltriethoxysilane, decyltriethoxysilane, dodecyltriethoxysilane, myristyltriethoxysilane, stearyltriethoxysilane, and the like.

Other trialkoxysilanes containing unsaturated aliphatic groups which may be used in preparing compounds of the present invention include vinyltrimethoxysilane, vinyltriethoxysilane, allyltriethoxysilane, crotyltrimethoxysilane, 3-hexenyltrimethoxysilane, 2-ethyl-4-hexenyltrimethoxysilane, 9-octadecenyltriethoxysilane, 2-methyl-3-butynyltriethoxysilane, 3-methyl-1-pentynyltriethoxysilane, (1-ethynyl)-1-cyclohexanyltriethoxysilane, and the like.

The condensation reaction leading to the products of the present invention may be carried out simply by stirring together the trialkanolamine and the silicate or silane in the proper molecular proportions followed by heating at an elevated temperature. The reaction proceeds well at reflux temperature, reaching completion in most cases in a relatively short period of time. The by-product alcohol may readily be separated from the desired product by distillation. The products of the present invention are viscous liquids or glassy or crystalline solids.

The following specific examples are intended to illustrate the nature of the present invention without acting as a limitation upon the scope thereof.

*Example 1*

In a dry 500 ml. standard taper round bottom flask was placed 119.4 g. (0.8 mole) of pure triethanolamine and 166.6 g. (0.8 mole) of pure tetraethyl orthosilicate. The mixture was boiled under reflux for a total period of 12 hours. A homogeneous solution occurred within 30 minutes. The by-product ethyl alcohol was distilled off at reduced pressure at a temperature of 78°–35° C. (weight of distillate 96.7 g.; theoretical 110.4 g.) The flask was then heated at 110°–90° C. and 2 mm. pressure for one hour to eliminate all residual alcohol, producing a product in the form of a very viscous amber colored liquid (weight 164.7 g.; theoretical 175.6 g.). The viscous liquid eventually crystallized into a solid material which was very soluble in water and chloroform and insoluble in n-heptane. The compound has the structure:

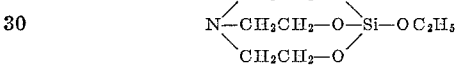

*Analysis.*—Calculated for $C_8H_{17}O_4NSi$: $Si=12.8\%$, $N=6.38\%$. Found: $Si=12.58\%$, $N=6.64\%$.

*Example 2*

In a dry 500 ml. standard taper round bottom flask were placed 134.0 g. (0.9 mole) of pure triethanolamine and 137.0 g. (0.22 mole) of partially hydrolyzed ethyl orthosilicate (40% silica minimum) having the average composition

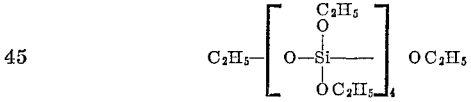

The two immiscible liquids were boiled under reflux at a pot temperature of 140°–150° C. for a total period of three hours. A homogeneous solution was obtained within 30 minutes. The by-product ethyl alcohol was distilled off at reduced pressure, the weight of distillate being 99.5 g. (theoretical 103.3 g.). The product was heated at 110° C. and 2 mm. pressure for one hour to eliminate all residual alcohol, then allowed to cool to room temperature, forming an amber colored solid tacky glass (weight 162.7 g.; theoretical 167.7 g.). The product was very soluble in water, chloroform, benzene, acetone and xylene and insoluble in ethyl ether, heptane and ethyl acetate.

*Analysis.* — Calculated for $C_{24}H_{50}O_{15}N_4Si_4$: $Si = 15.02\%$, $N = 7.50\%$. Found: $Si = 14.84\%$, $N=7.64\%$.

*Example 3*

In a dry 500 ml. standard taper round bottom flask was placed 208.3 g. (1.0 mole) of pure tetraethyl silicate and 191.3 g. (1.0 mole) of pure triisopropanolamine. The mixture was heated under reflux at a pot temperature of 140°–150° C. for a period of five hours, the by-product ethyl alcohol then being removed by distillation first at atmospheric pressure, finally in vacuo (weight of distillate 141 g.; theoretical 138.3 g.). The product, in the form of an amber colored viscous liquid which crystallized on standing, weighed 257.4 g. (theoretical 261.3 g.) and after recrystallization melted at 81.7°–82.2° C. It had the structure:

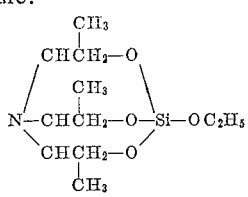

*Analysis.*—Calculated for $C_{11}H_{23}O_4NSi$: N=5.36%, Si=10.73%. Found for r e c r y s t a l l i z e d product: N=5.46%, Si=10.58%.

Example 4

In a dry 500 ml. standard taper flask was placed 104.2 g. (0.5 mole) of pure tetraethyl silicate, 74.6 g. (0.5 mole) of triethanolamine and 35.6 g. (0.25 mole) of 2,5-dimethylhexyne - 3 - diol-2,5. The mixture was heated under reflux for a period of 18 hours. The ethyl alcohol by-product was removed by distillation, leaving a brown semi-solid material (weight 123.2 g.; theoretical 122.2 g.). The product, which was very soluble in water, was found on analysis to contain 24.58% $SiO_2$; calculated for $C_{20}H_{36}O_8N_2Si_2$: 23.43%.

Example 5

In a dry 500 ml. standard taper round bottom flask was placed 95.0 g. (0.5 mole) of vinyl triethoxysilane and 79.5 g. (0.53 mole) of pure triethanolamine. The mixture was refluxed for a period of 16 hours, a homogeneous solution being obtained within one-half hour. After slight cooling of the mix, crystallization into long needles occurred. It was diluted with 66 g. of dry benzene and cooled. A total weight of 90 g. of white crystalline product was obtained (theoretical 100.6 g.), M.P.=166.2°–167.4° C. (corr.), with sintering at 161° C. The compound was quite soluble in water, chloroform, para-dioxane and hot benzene and slightly soluble in isopropanol, n-heptane and cold benzene. On cooling, the melted material recrystallized and melted at the same temperature. It had the structure:

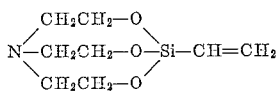

*Analysis.*—Calculated for $C_8H_{15}O_3NSi$: C=47.74%, H=7.51%, N=6.96%. Found: C=47.59%, H=8.12%, N=6.82%.

Example 6

In a dry 500 ml. standard taper round bottom flask were placed 96.2 g. (0.5 mole) of pure ethyl triethoxysilane and 74.6 g. (0.5 mole) of pure triethanolamine. Approximately 0.5 g. of ferrous chloride was added as catalyst, the temperature was raised to 155° C., and the ethyl alcohol by-product was distilled off (weight 61.4 g.; theoretical 69 g.). The residue crystallized; after drying in vacuum desiccator overnight the crystals weighed 99.9 g. (theoretical 101.8 g.). The product was very soluble in cold water, benzene, chloroform, acetone, methanol, hot isopropanol, alcohol and hot cyclohexane. It was slightly soluble in cold isopropanol, alcohol, hot heptane and cold cyclohexane. Melting point of the recrystallized product was 134.0°–135.0° C. (corr.). It possessed the structure:

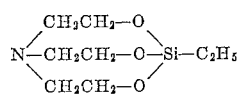

*Analysis.*—Calculated for $C_8H_{17}O_3NSi$: C=47.26%, H=8.43%, N=6.89%. Found: C=46.92%, H=8.35%, N=6.93%.

Example 7

In a dry 1 l. standard taper round bottom flask were placed 149.2 g. (1.0 mole) of pure triethanolamine, 234.4 g. (1.0 mole) of amyltriethoxysilane, and a mixture of 2 g. of ferric chloride and a small crystal of ferrous chloride as catalyst. The mixture was boiled under reflux for a period of 3½ hours at a pot temperature of 140°–150° C. The by-product ethyl alcohol was distilled off at a pot temperature of 140°–200° C. (weight 137.2 g.; theoretical 138.0 g.). The dark brown viscous liquid residue was distilled at reduced pressure at a pot temperature of 190°–200° C. Two fractions distilled over, one at a temperature of 121°–122° C. and 0.3 mm. and the other about 130° C. and 0.3 mm., indicating the presence of two different isomeric amyl groups in the molecule. The distillate, part of which crystallized to a white solid upon standing, was insoluble in water but soluble in acetone, chloroform, benzene and isopropyl alcohol. The structure was as follows:

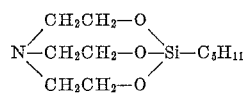

*Analysis.*—Calculated for $C_{11}H_{23}O_3NSi$: C=53.83%, H=9.44%, N=5.71%. Found: C=53.94%, H=9.49%, N=5.80%.

Example 8

In a dry 500 ml. standard taper round bottom flask was placed 83.5 g. (0.44 mole) of pure vinyl triethoxysilane and 84.1 g. (0.44 mole) of pure triisopropanolamine. The mixture was heated under reflux at a pot temperature of 120°–160° C. for nine hours. No catalyst was necessary. The ethanol by-product was removed by distillation, leaving a yellow oil weighing 113.7 g. (theoretical 106.9 g.). It was recrystallized from ethyl ether and petroleum ether, the recrystallized product having a melting point of 103.3°–104.5° C. (corr.). The product, which was very soluble in water, chloroform, bromoform and ethyl ether, had the structure:

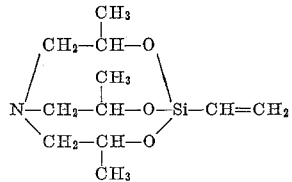

*Analysis.*—Calculated for $C_{11}H_{21}O_3NSi$: N=5.75%, Si=11.53%. Found: N=5.63%, Si=11.71%, 11.46%.

Example 9

In a dry 125 ml. standard taper flask were placed 37.3 g. (0.25 mole) of pure triethanolamine and 55.4 g. (0.25 mole) of gamma-aminopropyltriethoxysilane. A homolgeneous solution was obtained. The mixture was heated slowly to a temperature of 128°–138° C., the alcohol which distilled off weighing 32.5 g. (theoretical 34.5 g.). The solution was then heated at a temperature of 138°–110° C. at 12 mm. pressure for about 20 minutes to remove the last traces of by-product alcohol. The product crystallized immediately on cooling, weighing 58.3 g. (theoretical 58.2 g.), M.P. (sealed tube capillary method)=87.2°–87.9° C. The product had the composition.

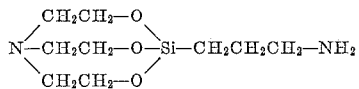

*Analysis.*—Calculated for $C_9H_{20}O_3N_2Si$: $SiO_2$=25.85%. Found: $SiO_2$=25.78%.

Example 10

In a dry 500 ml. standard taper flask were placed 41.7 g. (0.2 mole) of pure ethyl orthosilicate and 38.9 g.

(0.2 mole) of triisopropanolamine. The mixture was refluxed for a period of 18 hours at a pot temperature of 125°–135° C., and after cooling 70.2 g. of Abitol was added. This amounted to 0.2 mole, based upon a content of about 85% by weight of abietyl alcohol in the Abitol (the remainder being inert). The mixture was then refluxed for an additional 20 hours, after which the by-product alcohol was distilled off first at atmospheric pressure and finally in vacuum to remove the last traces of alcohol. The temperature of the bath at the final stage was 170°–180° C. Weight of yellow, very viscous, tacky product = 114.7 g. (theoretical 114.0 g.). The product was insoluble in water, but was surface active. It was very soluble in aliphatic and aromatic hydrocarbons.

*Analysis.*—Calculated for product assuming 85% abietyl alcohol in Abitol: $SiO_2 = 10.6\%$. Found: $SiO_2 = 9.58\%$.

*Example 11*

In a dry 500 ml. standard taper flask were placed 38.3 g. (0.2 mole) of triisopropanolamine and 41.7 g. (0.2 mole) of pure tetraethyl orthosilicate. The mixture was refluxed for 16 hours at a temperature of about 120°–140° C. during which time it became homogeneous, then cooled to room temperature, and 27.6 g. (0.2 mole) of phenyl-1,2-ethylenediol was added. Heat was evolved on mixing. The resulting homogeneous solution was refluxed for four hours at 125°–135° C., after which the alcohol by-product was removed by distillation, first at atmospheric pressure and finally in vacuum.

Weight of light brown viscous liquid product = 71.2 g. (theoretical 70.8 g.). The product was soluble in water and in benzene and was insoluble in n-heptane.

*Analysis.*—Calculated for $C_{17}H_{27}O_5NSi$: $SiO_2 = 16.99\%$. Found: $SiO_2 = 15.50\%$.

*Example 12*

In a dry 500 ml. standard taper flask were placed 37.3 g. (0.25 mole) of pure triethanolamine and 52.1 g. (0.25 mole) of pure tetraethyl orthosilicate. The mixture was refluxed for three hours at 120°–130° C. following which 14.5 g. of alcohol by-product was removed by distillation at atmospheric pressure. The solution was then cooled to room temperature, 23.0 g. (0.25 mole) of glycerine was added, and the solution was refluxed for a total period of 18 hours at a temperature of about 120°–130° C. The by-product alcohol was distilled off first at atmospheric pressure, then under vacuum. The total weight of by-product alcohol amounted to 45.7 g. (theoretical 46.0 g.) while the weight of the very viscous liquid product was 66.7 g. (theoretical 66.4 g.). The product was very soluble in water and was soluble in chloroform, acetone and benzene.

*Analysis.*—Calculated for $C_9H_{19}O_6NSi$: $SiO_2 = 22.64\%$. Found: $SiO_2 = 21.91\%$.

*Example 13*

In a dry 500 ml. standard taper flask were placed 44.8 g. (0.3 mole) of pure triethanolamine and 62.5 g. (0.3 mole) of pure tetraethyl orthosilicate. The mixture was refluxed at 130°–140° C. for a period of 22 hours, after which by-product alcohol was removed at a temperature of 58°–78° C. at reduced pressure. To the residue was added 9.2 g. (0.1 mole) of pure glycerine, the mixture was refluxed for 20 hours at 140°–150° C., and additional by-product alcohol was removed first at atmospheric pressure and finally at reduced pressure, the bath temperature being 150°–165° C. The total weight of by-product alcohol was 40.0 g. (theoretical 41.4 g.), while the weight of the glassy product was 61.9 g. (theoretical 61.3 g.). The product was very soluble in water, slightly soluble in bromoform and benzene, and insoluble in n-heptane.

*Analysis.*—Calculated for $C_{21}H_{41}O_{12}N_3Si_3$: $SiO_2 = 29.45\%$. Found: $SiO_2 = 28.18\%$.

It will be understood that other similar compounds within the scope of the present invention may be made in accordance with the same procedures described in the foregoing specific examples by employing the appropriate starting materials, examples of which are given on the preceding pages.

Although specific embodiments of the invention have been described herein, it is not intended to limit the invention solely thereto, but to include all of the obvious variations and modifications within the spirit and scope of the appended claims.

What is claimed is:

1. A compound selected from the group consisting of compounds having the structure

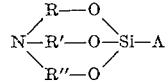

in which R, R' and R" are members of the class consisting of —CH₂CH₂— and

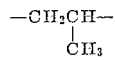

and A is a member of the class consisting of alkyl of 1 to 18 carbon atoms, alkenyl of 2 to 18 carbon atoms, lower alkynyl of up to 6 carbon atoms, beta-carboxyethyl, gamma-aminopropyl, benzyl, (1-ethynyl)-1-cyclohexanyl, and alkoxy having from 1 to 20 carbon atoms.

2. A condensation product formed by condensing one molar proportion of (1) a glycol selected from the class consisting of those having the structure $R'''(OH)_n$ where $n$ is an integer from 2 to 3 and $R'''$ is saturated open chain hydrocarbon of 2 to 12 carbon atoms; phenyl-ethanediol-1,2; 1,5-hexadiene-3,4-diol; 2,3-diphenylbutanediol-2,3; 2,4-diphenylbutanediol-1,3; 2-methyl-2-nitropropanediol-1,3; 2-ethyl-2-nitropropanediol-1,3; 3-chloropropanediol-1,2; dihydroxyacetone; 2,5-dimethylhexyne-3-diol-2,5; glycerol-1-octadecyl ether; glycerol monoacetate; glycerol monolaurate; glycerol monostearate; glycerol monopalmitate; glycerol monooleate; and glycerol monobenzoate with (2) $n$ molar proportions of a tetraalkylsilicate having the structure $(R_1O)_4Si$ in which $R_1$ is alkyl of 1 to 4 carbon atoms and with $n$ molar proportions of a nitrogen compound having the structure

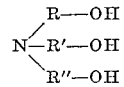

in which R, R' and R" are members of the class consisting of —CH₂CH₂— and

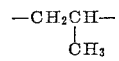

with the elimination of $4n$ molar proportions of an alkanol having the structure $R_1OH$.

3. A compound selected from the group consisting of condensation products formed by condensing one molar proportion of a compound having the structure

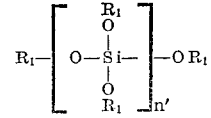

in which $n'$ is an integer from 2 to 4 and $R_1$ is alkyl of 1 to 4 carbon atoms with a nitrogen compound having the structure

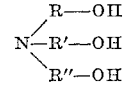

in which R, R' and R" are members of the class consisting of —CH₂CH₂— and

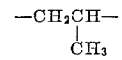

the number of molar proportions of said nitrogen compound being equal to said integer $n'$, with the elimination of 2n'+2 molar proportions of an alkanol having the structure R₁OH.

4. The compound of structure

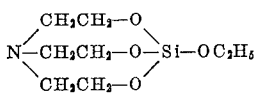

5. The compound of structure

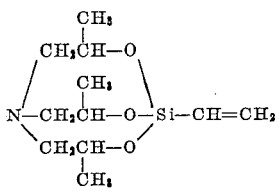

6. The compound of structure

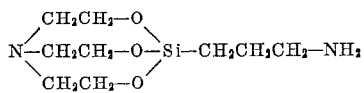

7. A compound consisting of the condensation product formed by condensing one molar proportion of 2,5-dimethylhexyne-3-diol-2,5 with two molar proportions of tetraethyl silicate and with two molar proportions of triethanolamine with the elimination of eight molar proportions of ethyl alcohol.

References Cited in the file of this patent
UNITED STATES PATENTS
2,541,154    Clapsadle _____ Feb. 13, 1951